United States Patent
Busch et al.

(10) Patent No.: US 7,680,000 B2
(45) Date of Patent: Mar. 16, 2010

(54) METHOD FOR PRODUCTION OF AN ANTENNA SECTION FOR AN UNDERWATER ANTENNA

(75) Inventors: Rainer Busch, Oldenburg (DE); Ranier-Martin Schütz, Stuhr (DE)

(73) Assignee: ATLAS ELEKTRONIK GmbH, Bremen (DE)

( * ) Notice: Subject to any disclaimer, the term of this patent is extended or adjusted under 35 U.S.C. 154(b) by 543 days.

(21) Appl. No.: 11/658,863

(22) PCT Filed: Jul. 2, 2005

(86) PCT No.: PCT/EP2005/007165

§ 371 (c)(1), (2), (4) Date: Jan. 30, 2007

(87) PCT Pub. No.: WO2006/015665

PCT Pub. Date: Feb. 16, 2006

(65) Prior Publication Data

US 2009/0207695 A1    Aug. 20, 2009

(30) Foreign Application Priority Data

Aug. 5, 2004    (DE) ................. 10 2004 038 033

(51) Int. Cl.
*G01V 1/20* (2006.01)
*H01P 11/00* (2006.01)

(52) U.S. Cl. ........................................ 367/154
(58) Field of Classification Search ............. 367/154, 367/165, 173; 29/594, 600

See application file for complete search history.

(56) References Cited

U.S. PATENT DOCUMENTS

| | | | | |
|---|---|---|---|---|
| 5,382,286 A | * | 1/1995 | Fanning et al. | 106/162.2 |
| 5,499,219 A | | 3/1996 | Brenner et al. | |
| 2009/0190442 A1 | * | 7/2009 | Busch et al. | 367/154 |
| 2009/0207695 A1 | * | 8/2009 | Busch et al. | 367/154 |

FOREIGN PATENT DOCUMENTS

| | | |
|---|---|---|
| DE | 37 39 185 A1 | 6/1989 |
| DE | 195 18 461 C1 | 6/1996 |
| DE | 103 23 493 B3 | 7/2004 |

(Continued)

*Primary Examiner*—Dan Pihulic
(74) *Attorney, Agent, or Firm*—Fitch, Even, Tabin & Flannery; Norman N. Kunitz

(57) ABSTRACT

The invention relates to a method for production of an antenna section comprising a hydrophone (12) for a submarine antenna which may be composed of several antenna sections, whereby the hydrophones are arranged in a row one behind the other in a rectangular cavity (20) at a separation from each other on the inner wall of the cavity and the cavity is filled with a liquid gel (19) to fix the hydrophones, which thickens after introduction. According to the invention, the assembly procedure for the introduction and positioning of the hydrophones may be simplified whereby each hydrophone is inserted and fixed in the cavity with the longitudinal axis thereof essentially vertical, at a given separation from the previously inserted hydrophone, by means of a pipette (16). Liquid gel is then introduced into the cavity to such an amount that the liquid gel at least partly encloses the hydrophone held by the pipette. After the applied gel has thickened the pipette is withdrawn from the cavity for the insertion of another hydrophone, whereupon the method steps are repeated until the required number of hydrophones are inserted in the cavity.

10 Claims, 2 Drawing Sheets

FOREIGN PATENT DOCUMENTS

| | | |
|---|---|---|
| EP | 0 181 506 | 5/1986 |
| EP | 0 654 953 A1 | 5/1995 |
| GB | 2 212 695 A | 7/1989 |
| GB | 2 300 917 A | 11/1996 |
| GB | 2300917 A * | 11/1996 |
| WO | WO 93/17356 | 9/1993 |

* cited by examiner

US 7,680,000 B2

METHOD FOR PRODUCTION OF AN ANTENNA SECTION FOR AN UNDERWATER ANTENNA

CROSS REFERENCE TO RELATED APPLICATION

This Application is a U.S. Utility Patent Application filing under section 371 of International Patent Application PCT/EP2005/007165, filed Jul. 2, 2005, and claims priority from German Application No. 10 2004 038 033.3, filed Aug. 5, 2004, the complete disclosures of which are incorporated herein by reference.

BACKGROUND OF THE INVENTION

The invention relates to a method for production of an antenna section, which has hydrophones at a distance from one another, for an underwater antenna which can be assembled from a plurality of antenna sections, of the generic type defined in the precharacterizing clause of claim 1.

A known underwater antenna (DE 195 18 461 C1), which is in the form of a towed array, comprises a plurality of towed array sections whose section ends are adjacent to one another. Each towed array section has a plurality of hydrophones which are arranged in a row one behind the other at a constant distance from one another, are accommodated in a flexible tube, which can bend elastically and is composed of polyethylene, and are fixed in their position at a distance from one another and at a distance from the flexible tube wall by a gel which is adhesively bonded to them. The hydrophones are connected to the signal line and to electrical lines which are used for supplying power and are composed of copper or are in the form of optical fibers, which are passed out of the towed array section at the section ends for connection to the next towed array section. In order to produce a towed array section, the hydrophones associated with it are fixed at the precise longitudinal distance from one another in a very coarse nylon mesh with a small number of relatively elastic longitudinal threads. The so-called element skeleton that is produced in this way is floated into the flexible tube together with the still liquid gel, with measures being taken to fix the hydrophones centrally in the flexible tube while being adhesively bonded to the gel. Measures such as these may, for example, comprise the flexible tube being rotated during the adhesive bonding of the gel, so that the skeleton is aligned centrally, or comprise soft, thin bristles being arranged on the skeleton, which are supported on the inner wall of the flexible tube and thus ensure that the hydrophones are centralized.

The invention is based on the object of specifying a method, which is cost-effective from the production engineering point of view, for production of an antenna section, by means of which the hydrophones can be mounted with accurate tolerances with respect to the antenna section.

SUMMARY OF THE INVENTION

According to the invention, the object is achieved by the features in claim 1.

The method according to the invention has the advantage that the hydrophones are introduced centrally into the predetermined cavity in a position such that the distances between them are accurate, by simple assembly means, and are fixed in this position by means of the gel, which forms an adhesive bond in a short time period. The suction lifter for transportation and positioning of the hydrophones is simple to manufacture and requires only minor tool costs. The method can be fully automated, in which case the assembly time can also be significantly shortened by the provision of assembly means which operate in parallel, such as suction lifters and grippers. The method can be used not only for production of antenna segments for so-called towed arrays, in which the hydrophones are accommodated arranged in a row one behind the other in a flexible tube which can bend elastically, but also for the production of antenna segments for so-called antenna arrays, in which the hydrophones are accommodated in rows and/or columns in plastic encapsulation at a constant distance from one another. The plastic encapsulation may be both a planar body and a curved, stiff body.

Expedient embodiments of the method according to the invention, together with advantageous developments and refinements of the invention, are specified in the further claims.

According to one advantageous embodiment of the invention, a tube whose external diameter is considerably smaller than the external diameter of the hydrophones, which are in the form of spheres, is used as the suction lifter. A suction pressure or vacuum pressure is produced at that end of the tube which is remote from the hydrophone, so that the hydrophone is held by means of suction force at the front end of the tube, is moved into the cavity and is held in its position there until the adhesive gel bond has formed. The suction lifter is then detached from the hydrophone by removal of the suction pressure.

BRIEF DESCRIPTION OF THE DRAWINGS

The invention will be described in more detail in the following text with reference to one exemplary embodiment which is illustrated in the drawing, in which.

DETAILED DESCRIPTION OF THE INVENTION

Figure 1:
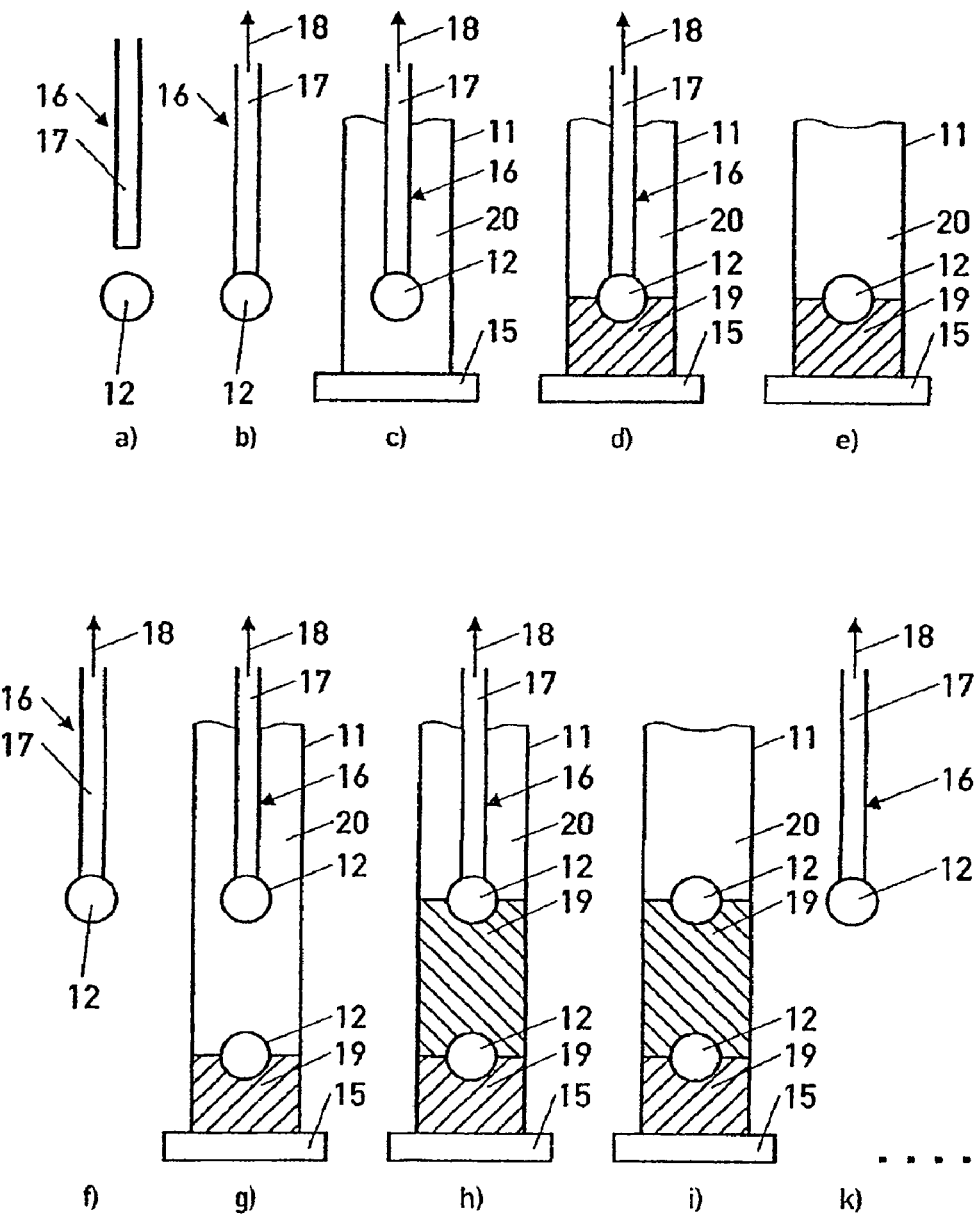
FIG. 1 shows a schematic illustration of individual method steps in the method for production of an antenna section.
Figure 2:
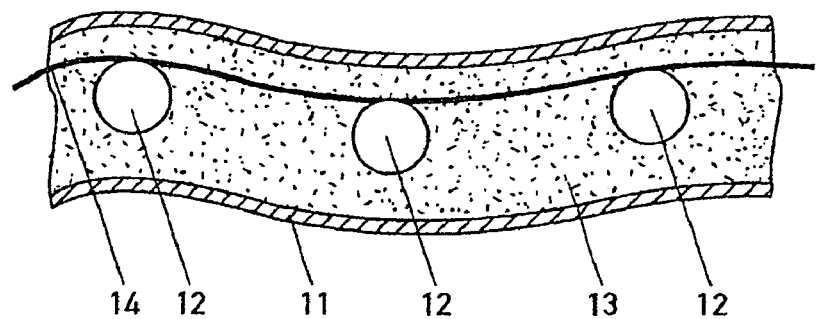
FIG. 2 shows a detail of an antenna section, which has been produced using the method, for an underwater towed antenna.

The method whose individual method steps are illustrated in FIG. 1 is used, by way of example, to produce an antenna section for a so-called towed antenna, a detail of which is illustrated in the form of a schematic section in FIG. 2. The antenna section has a flexible tube 11 which is preferably composed of polyethylene, and a plurality of hydrophones 12, which are arranged in a row one behind the other, at a constant distance from one another and in this may be in the form of spherical elements or else may have other geometric shapes, for example a cylindrical shape. The hydrophones 12 are arranged centrally in the flexible tube 11 at a radial distance from the flexible tube wall, and are fixed in their position by a gel filling 13 in the flexible tube 11. The hydrophones 12 are connected to electrical lines composed of copper or to glass fibers, which are used for carrying signals and to supply power to the hydrophones 12. The antenna section as shown in FIG. 2 is produced as follows using the method illustrated in FIG. 1:

The empty flexible tube 11, which represents a cavity 20, is aligned vertically and is closed at one end by a closure plate 15. A suction lifter 16 (FIG. 1a) is used for transportation and positioning of the hydrophones 12. The suction lifter 16 comprises a tube 17 whose unobstructed tube diameter is considerably smaller than the external diameter of the hydrophones 12, which are in the form of spheres. A suction pressure or vacuum pressure is produced at that tube end which is remote from the tube end which points toward the hydrophone 12, as is indicated by the arrows 18 in FIG. 1.

This suction pressure fixes the hydrophone 12 to the tube end, allowing it to be transported by means of the suction lifter 16 (FIG. 1b).

A first hydrophone 12 is now inserted centrally into the flexible tube 11 at a predetermined distance from the flexible tube end, that is to say from the closure plate 15, and is held in this position (FIG. 1c). An amount of liquid gel 19 is now introduced into the flexible tube 11 such that the hydrophone 12 which is held by the suction lifter 16 is partially surrounded by the gel 19. The amount of gel must not be so great that the tube 17 of the suction lifter 16 is also surrounded by the gel 19. By way of example, the amount of gel introduced in FIG. 1 is such that half of the hydrophone 12 is surrounded by the gel 19. The suction pressure on the suction lifter 16 and the positioning of the suction lifter 16 are maintained until the gel 19 has largely formed an adhesive bond, that is to say it has formed a gel (FIG. 1d). As a result of the gel formation, the hydrophone 12 can no longer change its position in the flexible tube 11 when the suction pressure for the suction lifter 16 is switched off and the suction lifter 16 is removed from the flexible tube 11 again (FIG. 1e). The suction lifter 16 is used to grip a further hydrophone 12 (FIG. 1f) and to move it into the flexible tube 11 at a predetermined distance from the previously inserted hydrophone 12 (FIG. 1g). The second hydrophone 12 is held in this position while liquid gel 19 is once again introduced into the flexible tube 11, partially surrounding the second hydrophone 12 (FIG. 1h). Once the new gel filling has formed a gel, then the suction lifter 16 is lifted off from the second hydrophone 12 by switching off the suction pressure, and is removed from the flexible tube 11 (FIG. 1i). The suction lifter 16 is used to grip a new hydrophone 12 (FIG. 1k), which is inserted into the flexible tube 11 in the same way as that described above, after which liquid gel 19 is once again introduced. The described method steps are repeated until the predetermined number of hydrophones 12 have been inserted into the flexible tube 11.

Figure 3:
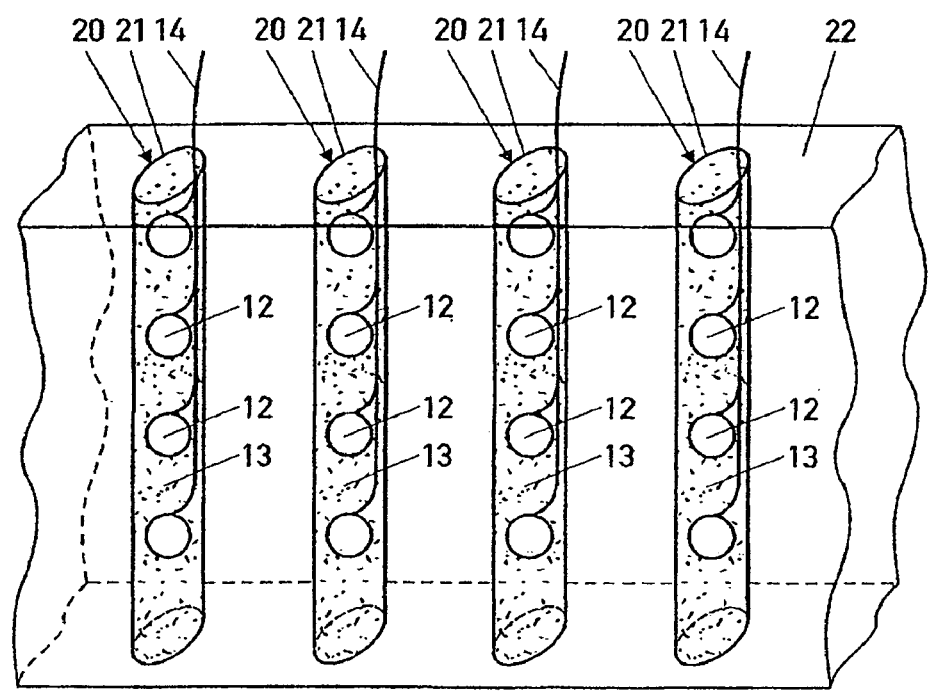
FIG. 3 shows a detail of an antenna section, which has been produced according to the method, for an underwater antenna array.

The antenna section, a detail of which is illustrated in FIG. 3, for an underwater antenna array, a so-called flat antenna, is produced using the same method as that illustrated in FIG. 1. The antenna section has a cavity 20 in the form of a plurality of channels 21 which are arranged at the same distance from one another, are embedded in a plastic body 22, and pass entirely through it. These cylindrical channels 21 are produced by inserting small tubes into a casting mold at a predetermined distance from one another, and encapsulating them with plastic. After removal from the mold, the small tubes are removed again from the plastic body 22, thus resulting in the cylindrical channels 21 which pass completely through the plastic body 22. As can be seen from FIG. 3, four hydrophones 12, by way of example, are arranged one above the other and at a defined distance from one another in each channel 21 and maintain a radial distance from the inner wall of the channel 21. The channel 21 is filled with the gel 19, and the gel 19 fixes the hydrophones 12, once it has formed a gel. Each hydrophone 12 is connected to an electrical supply line 14, and all of the electrical supply lines are passed out on one side of the channels 21.

The hydrophones 12 are introduced into the channels 21 in the plastic body 22 in the same manner as in FIG. 1 for the flexible tube 11, which likewise forms a cavity 20, for the towed antenna as shown in FIG. 2. The plastic body 22 is for this purpose placed on a closure plate 15 at the position illustrated in FIG. 3, so that all of the channels 21 are closed at the lower end. The individual hydrophones 12 are then inserted—as described with reference to FIG. 1—into the channels 21 by means of suction lifters 16, which preferably operate in parallel, and the channels 21 are successively filled with gel 19, as described in FIG. 1. This results in the antenna section, a detail of which is sketched in FIG. 3, and which can have further identical antenna sections added to it, whose plastic bodies are placed on the plastic body 21 in the longitudinal direction or lateral direction, to form a flat antenna. The hydrophones 12 which are held "floating" in the plastic body 21 by means of the gel filling 13 are largely decoupled, in terms of sound, from the plastic body 21.

The invention claimed is:

1. A method for production of an antenna section, which has hydrophones at a distance from one another, for an underwater antenna which can be assembled from a plurality of antenna sections, in which the hydrophones are introduced in a row one behind the other into an elongated cavity, at a distance from one another and at a distance from the inner wall of the cavity, and the cavity is filled with a liquid gel in order to fix the hydrophones, which liquid gel forms a gel after being introduced, wherein each hydrophone is inserted and held approximately centrally by means of a suction lifter into the cavity, whose longitudinal axis is aligned essentially vertically, at a predetermined distance from the previously inserted hydrophone, an amount of liquid gel is then introduced into the cavity such that the liquid gel at least partially surrounds the hydrophone which is being held by the suction lifter, and, once the gel which has been introduced has formed a gel, the suction lifter is removed from the cavity for insertion of a next hydrophone and, these method steps are repeated until the predetermined number of hydrophones have been placed in the cavity.

2. The method as claimed in claim 1, wherein a flexible tube which defines an antenna section of the underwater antenna is used as the cavity.

3. The method as claimed in claim 2, wherein polyethylene is used as the flexible tube material.

4. The method as claimed in claim 1, wherein a plurality of channels, which preferably run parallel at the same distance from one another, are used as the cavity in a plastic body which defines one antenna section of the underwater antenna.

5. The method as claimed in claim 4, wherein small tubes are inserted, separated from one another but parallel, into a casting mold in order to produce the channels, and are encapsulated with plastic, and, after removal from the mold, the small tubes are removed from the plastic body.

6. The method as claimed in claim 5, wherein a tube whose unobstructed diameter is less than the external diameter of the hydrophones, which are in the form of spheres, is used as the suction lifter, and the one tube end of the suction lifter is placed on the hydrophone, and a suction pressure is produced at the other tube end.

7. The method as claimed in claim 1, wherein a tube whose unobstructed diameter is less than the external diameter of the hydrophones, which are in the form of spheres, is used as the suction lifter, and the one tube end of the suction lifter is placed on the hydrophone, and a suction pressure is produced at the other tube end.

8. The method as claimed in claim 2, wherein a tube whose unobstructed diameter is less than the external diameter of the hydrophones, which are in the form of spheres, is used as the suction lifter, and the one tube end of the suction lifter is placed on the hydrophone, and a suction pressure is produced at the other tube end.

9. The method as claimed in claim 3, wherein a tube whose unobstructed diameter is less than the external diameter of the hydrophones, which are in the form of spheres, is used as the suction lifter, and the one tube end of the suction lifter is placed on the hydrophone, and a suction pressure is produced at the other tube end.

10. The method as claimed in claim 4, wherein a tube whose unobstructed diameter is less than the external diameter of the hydrophones, which are in the form of spheres, is used as the suction lifter, and the one tube end of the suction lifter is placed on the hydrophone, and a suction pressure is produced at the other tube end.

* * * * *